United States Patent [19]
Park et al.

[11] Patent Number: 5,522,216
[45] Date of Patent: Jun. 4, 1996

[54] THERMOELECTRIC REFRIGERATOR

[75] Inventors: Brian V. Park, Austin; Malcolm C. Smith, Jr., La Porte, both of Tex.; Ralph D. McGrath, Granville, Ohio; Michael D. Gilley, Rowlett, Tex.; Lance Criscuolo, Dallas, Tex.; John L. Nelson, Garland, Tex.

[73] Assignees: Marlow Industries, Inc., Dallas, Tex.; Owens-Corning Fiberglas Corporation, Granville, Ohio; Oceaneering International, Inc., Houston, Tex.

[21] Appl. No.: 180,887

[22] Filed: Jan. 12, 1994

[51] Int. Cl.$^6$ .................................................. F25B 21/02
[52] U.S. Cl. .................................................. 62/3.6; 62/405
[58] Field of Search .......................... 62/3.6, 3.62, 405, 62/406

[56] References Cited

U.S. PATENT DOCUMENTS

| | | | |
|---|---|---|---|
| 1,964,795 | 7/1934 | Frary | 428/76 |
| 2,275,365 | 3/1942 | Hintze | 312/406 |
| 2,768,046 | 10/1956 | Evans | 312/406 |

(List continued on next page.)

FOREIGN PATENT DOCUMENTS

| | | | |
|---|---|---|---|
| 0242363 | 12/1962 | Australia | 312/406 |
| 627705 | 3/1992 | Australia . | |
| 1126180 | 6/1982 | Canada | B65D 3/22 |
| 0342165 | 11/1989 | European Pat. Off. | F25B 21/02 |
| 2432693 | 6/1980 | France . | |
| 1125957 | 6/1960 | Germany . | |
| 1198837 | 8/1965 | Germany . | |
| 1401585 | 6/1970 | Germany | 312/406 |
| 2529801 | 2/1976 | Germany | 312/406 |
| 3503281 | 1/1985 | Germany | F25B 21/02 |
| 320580 | 1/1991 | Japan . | |
| 0671283 | 4/1952 | United Kingdom | 312/406 |
| 8101739 | 6/1981 | WIPO | F25B 21/02 |
| 8504948 | 11/1985 | WIPO | F25B 21/02 |
| WO9204301 | 3/1992 | WIPO | C04B 30/02 |

OTHER PUBLICATIONS

"The World's Most Thermally-Efficient Cabinet, Using Environmental-Friendly Refrigeration Technology" by Marlow Industries, Inc., Feb. 1995.

*Popular Science,* Home Technology, "Freon–Free Fridge," pp 42, Apr. 1995.

International Search Report Dated May 19, 1995, PCT/US95/00419.

International Search Report Dated May 24, 1995, PCT/US95/00496.

International Search Report Dated May 31, 1995, PCT/US95/00579.

"A New Scientific Development in Refrigeration" *Electric & Gas Technology, Inc.*

*Primary Examiner*—William E. Tapolcai
*Attorney, Agent, or Firm*—Baker & Botts

[57] ABSTRACT

A refrigerator is provided which combines the benefits of superinsulation materials with thermoelectric devices and phase change materials to provide an environmentally benign system that is energy efficient and can maintain relatively uniform temperatures for extended periods of time with relatively low electrical power requirements. The refrigerator includes a thermoelectric assembly having a thermoelectric device with a hot sink and a cold sink. The superinsulation materials include a plurality of vacuum panels. The refrigerator is formed from an enclosed structure having a door. The vacuum panels may be contained within the walls of the enclosed structure and the door. By mounting the thermoelectric assembly on the door, the manufacturer of the enclosed structure is simplified and the overall R rating of the refrigerator increased. Also an electrical motor and propellers may be mounted on the door to assist in the circulation of air to improve the efficiency of the cold sink and the hot sink. A propeller and/or impeller is preferably mounted within the refrigerator to assist in establishing the desired air circulation flow path.

6 Claims, 4 Drawing Sheets

U.S. PATENT DOCUMENTS

| | | | |
|---|---|---|---|
| 2,779,066 | 1/1957 | Gaugler et al. | 428/69 |
| 2,837,899 | 6/1958 | Lindenblad | 62/1 |
| 2,872,788 | 2/1959 | Lindenblad | 62/3 |
| 2,932,953 | 4/1960 | Becket et al. | 62/3 |
| 3,078,682 | 2/1963 | Gould | 62/3 |
| 3,177,670 | 4/1965 | Boehmer et al. | 62/3 |
| 3,177,671 | 4/1965 | Stambaugh | 62/3 |
| 3,240,029 | 3/1966 | Wurtz | 312/401 |
| 3,280,573 | 10/1966 | Brown et al. | 62/3 |
| 3,732,702 | 5/1973 | Desch | 62/3 |
| 3,821,881 | 7/1974 | Harkias | 62/3 |
| 3,823,567 | 7/1974 | Corini | 62/3 |
| 4,007,600 | 2/1977 | Simms | 62/3 |
| 4,043,624 | 8/1977 | Lindenschmidt | 312/406 |
| 4,088,183 | 5/1978 | Anzai et al. | 165/104 |
| 4,146,213 | 3/1979 | Regelin | 266/197 |
| 4,203,487 | 5/1980 | Gartner | 165/50 |
| 4,290,416 | 9/1981 | Maloney | 126/430 |
| 4,326,383 | 4/1982 | Reed et al. | 62/3 |
| 4,328,676 | 5/1982 | Reed | 62/3 |
| 4,383,414 | 5/1983 | Beitner | 62/3 |
| 4,467,611 | 8/1984 | Nelson et al. | 62/3 |
| 4,570,679 | 2/1986 | Schippl | 138/149 |
| 4,609,036 | 9/1986 | Schrader | 165/10 |
| 4,625,229 | 11/1986 | Maier | 357/81 |
| 4,627,242 | 12/1986 | Beitner | 62/3 |
| 4,637,222 | 1/1987 | Fujiwara | 62/244 |
| 4,644,753 | 2/1987 | Burke | 62/3 |
| 4,662,180 | 5/1987 | Menocal | 62/3 |
| 4,726,193 | 2/1988 | Burke et al. | 62/3 |
| 4,781,329 | 11/1988 | Tenny et al. | 239/305 |
| 4,838,911 | 6/1989 | Robertson et al. | 62/3.3 |
| 4,878,352 | 11/1989 | Weber et al. | 62/51.1 |
| 4,907,060 | 3/1990 | Nelson et al. | 357/72 |
| 4,922,822 | 5/1990 | Bierschenk et al. | 136/204 |
| 4,984,605 | 1/1991 | Schippl | 138/149 |
| 5,007,226 | 4/1991 | Nelson | 52/809 |
| 5,018,328 | 5/1991 | Cur et al. | 50/406 |
| 5,029,446 | 7/1991 | Suzuki | 62/3.6 |
| 5,064,476 | 11/1991 | Recine, Sr. | 136/201 |
| 5,082,335 | 1/1992 | Cur et al. | 312/401 |
| 5,090,981 | 2/1992 | Rusek, Jr. | 65/4.4 |
| 5,094,899 | 3/1992 | Rusek, Jr. | 428/69 |
| 5,157,893 | 10/1992 | Benson et al. | 52/792 |
| 5,168,339 | 12/1992 | Yokotani et al. | 257/64 |
| 5,171,372 | 12/1992 | Recine, Sr. | 136/203 |
| 5,209,069 | 5/1993 | Newman | 62/3.64 |
| 5,252,408 | 10/1993 | Bridges et al. | 428/621 |
| 5,291,746 | 3/1994 | Abbott | 62/89 |
| 5,315,830 | 5/1994 | Doke et al. | 62/3.2 |
| 5,330,816 | 7/1994 | Rusek, Jr. | 428/69 |
| 5,367,879 | 11/1994 | Doke et al. | 62/3.6 |

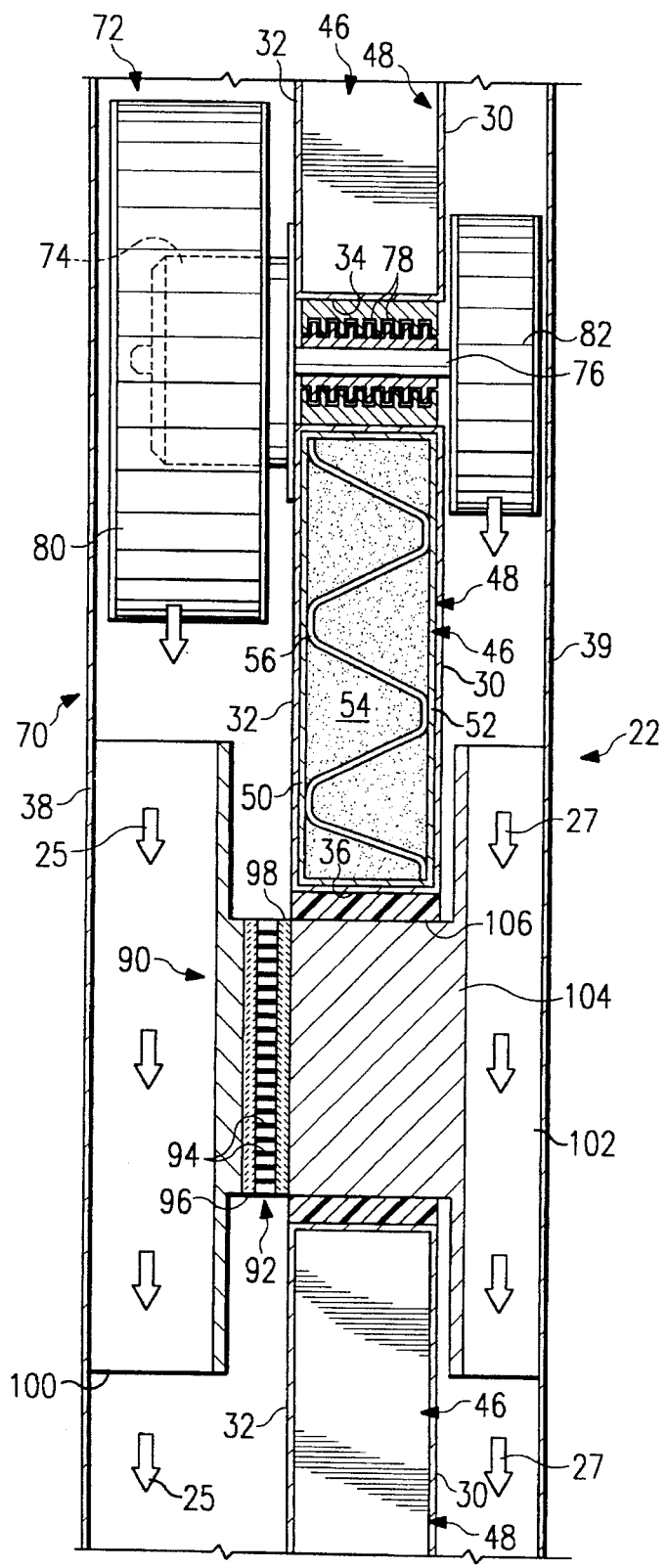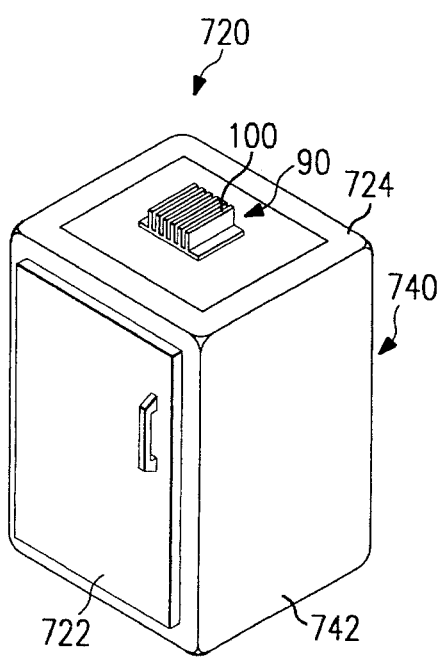
FIG. 7
FIG. 5

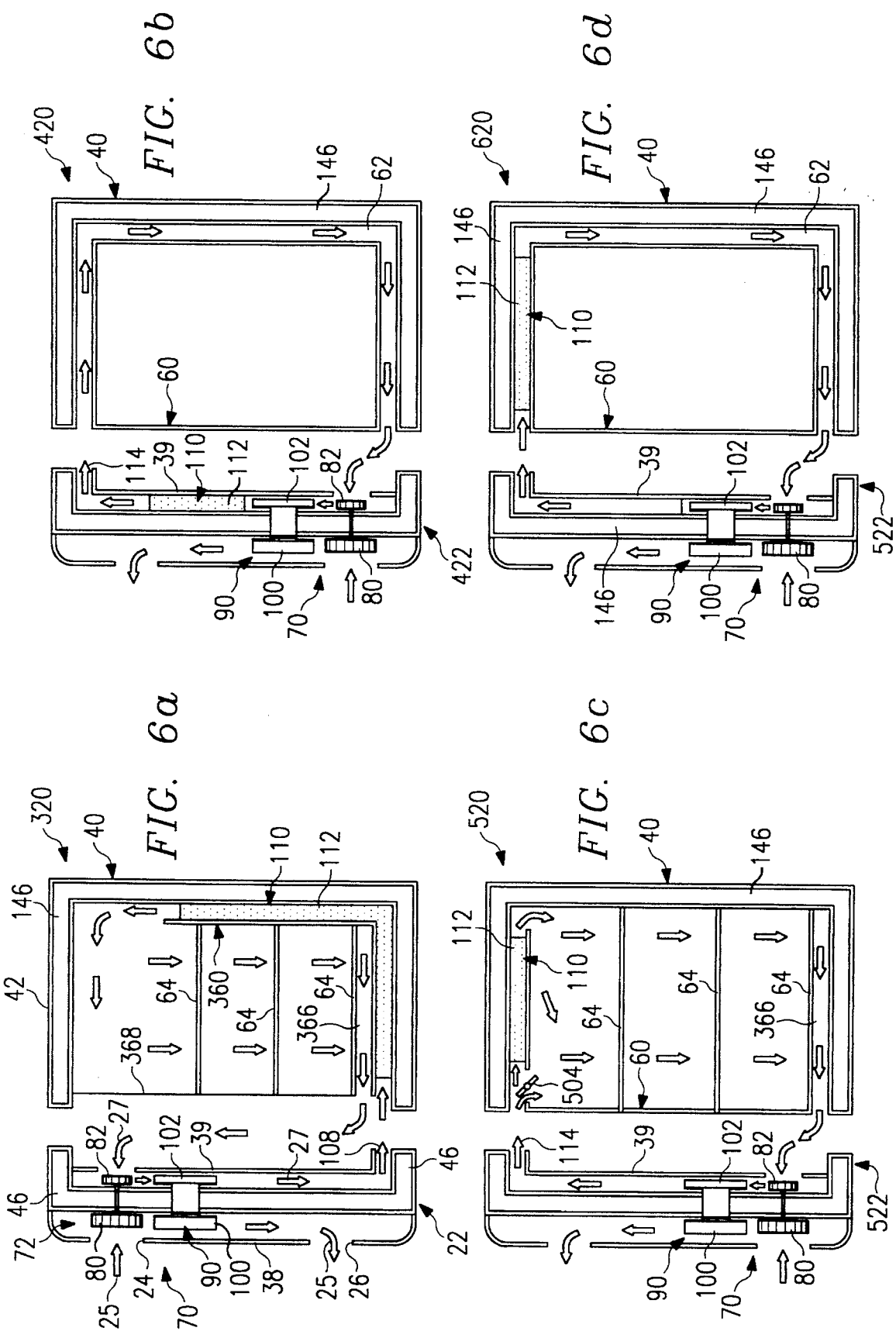

THERMOELECTRIC REFRIGERATOR

NOTICE

Portions of this invention were made with support of the United States Government under contract No. NAS8-5000 awarded by the National Aeronautics and Space Administration (NASA) and subcontract No. GY5509. The Government may have certain rights to the invention under the contract.

RELATED APPLICATIONS

This application is related to co-pending patent application Ser. No. 08/180,879 filed on Jan. 12, 1994 co-pending patent application Ser. No. 08/180,888 filed on Jan. 12, 1994 and co-pending patent application Ser. No. 08/180,456 filed on Jan. 12, 1994

TECHNICAL FIELD OF THE INVENTION

This invention relates to thermoelectric devices and more particularly to a thermoelectric refrigerator having enhanced insulation and energy storage capability.

BACKGROUND OF THE INVENTION

The basic theory and operation of thermoelectric devices has been developed for many years. Modern thermoelectric devices typically include an array of thermocouples which operate by using the Peltier effect. Thermoelectric devices are essentially small heat pumps which follow the laws of thermodynamics in the same manner as mechanical heat pumps, refrigerators, or any other apparatus used to transfer heat energy. The principal difference is that thermoelectric devices function with solid state electrical components (thermocouples) as compared to more traditional mechanical/fluid heating and cooling components.

When direct current (DC) electrical power is applied to a thermoelectric device having an array of thermocouples, heat is absorbed on the cold side of the thermocouples and passes through the thermocouples and is dissipated on the hot side of the thermocouples. A heat sink (sometimes referred to as the "hot sink") is preferably attached to the hot side of the thermoelectric device to aid in dissipating heat from the thermocouples to the adjacent environment. In a similar manner a heat sink (sometimes referred to as a "cold sink") is often attached to the cold side of the thermoelectric device to aid in removing heat from the adjacent environment. Thermoelectric devices are sometimes referred to as thermoelectric coolers; however, since they are a type of heat pump, thermoelectric devices can function as either a cooler or a heater.

There are a wide variety of containers and enclosed structures which are designed to be maintained within a selected temperature range. Examples of such containers and enclosed structures include, but are not limited to, refrigerators, picnic coolers, cabinets containing sensitive electronic equipment, and organ transplant containers. The use of thermoelectric devices which operate on a DC voltage system are well known to maintain desired operating temperatures in refrigerators and portable coolers. An example of a container having a thermoelectric cooler is shown in U.S. Pat. No. 4,726,193 entitled Temperature Controlled Picnic Box. Examples of refrigerators which function with a thermoelectric device are shown in U.S. Pat. No 2,837,899 entitled Thermoelectric Refrigerator; U.S. Pat. No. 3,177, 670 entitled Thermoelectric Refrigerator; and U.S. Pat. No. 3,280,573 entitled Refrigerator—Package Arrangement. U.S. Pat. No. 5,168,339, entitled Thermoelectric Semiconductor Having A Porous Structure Deaerated in a Vacuum and Thermoelectric Panel Using P-Type and N-Type Thermoelectric Semiconductors discloses an electronic refrigeration panel.

Conventional refrigerators typically consist of an insulated enclosure with a centralized cooling system based on the vapor compression cycle of fluorinated hydrocarbons (FREON®), or other types of hydrocarbons. The cooling system usually has greater cooling capacity than the actual heat load which results in the cooling system acting intermittently in a binary duty cycle—either on or off. This binary duty cycle results in temperature variations as the refrigerator warms up while the compressor is off and cools down when the compressor is running. Thus the temperature in a typical refrigerator is not steady, but cycles between an upper limit and a lower limit. This compressor cycling may reduce the operating efficiency of the associated cooling system.

Presently available cooling systems frequently include an air/evaporator interface which requires a relatively high air flow rate to obtain the best cooling efficiency and to prevent frost or ice from forming on the evaporator. This air flow rate is often in excess of the air velocities required to cool the interior of the refrigerator and results in further system inefficiencies.

Vapor compression cooling systems frequently use CFCs (chloro-fluorocarbons) such as FREON® as the working fluid. The negative effects of CFCs on the environment are well known and there exists both national and international regulations to ban the use of such CFCs. Other fluorocarbons such as HCFCs and HFCs have their own limitations and problems for use in refrigeration systems.

SUMMARY OF THE INVENTION

In accordance with the present invention, disadvantages and problems associated with previous thermoelectric refrigerators used to maintain selected temperatures within such refrigerators have been substantially reduced or eliminated. The present invention provides an efficient, non-fluorocarbon refrigerator system that combines superinsulation materials with thermoelectric devices and phase change materials to provide an environmentally benign system that is energy efficient.

In accordance with one aspect of the present invention, a refrigerator is provided with a thermoelectric assembly, insulating materials having high resistance to thermal conductivity such as with an R-value per inch greater than twenty (R20/inch), and an air flow management system within the interior of the refrigerator which cooperate with each other to substantially improve the coefficient of performance (COP) of the resulting refrigerator. By using insulating materials having an R-value per inch greater than twenty (R20/inch) (sometimes referred to as "superinsulation materials"), the heat load associated with operating the refrigerator is substantially reduced which makes possible the use of a thermoelectric assembly to provide the cooling system for the refrigerator. Various types of thermal energy storage containers and phase change materials may also be included within the refrigerator to further enhance the coefficient of performance to maximize the benefits of combining a thermoelectric assembly with insulating materials having an R-value per inch greater than twenty R20/inch).

Significant technical advantages of a refrigerator incorporating the present invention include lower power consumption resulting from overall improvements in the system operating efficiency. Since the cooling system includes a thermoelectric assembly, power spikes associated with the binary cycling of a typical fluorinated hydrocarbon vapor compressor have been eliminated. The resulting power consumption of the thermoelectric device is proportionate to the reduced heat load resulting from use of the superinsulation materials. Also, the use of insulating materials having an R-value per inch greater than twenty R20/inch) allows reducing the wall thickness of the refrigerator which results in a larger internal volume for the same overall external configuration. By using superinsulation materials in the fabrication of the refrigerator, the desired temperature or temperature range can be maintained for considerable periods of time within the refrigerator, even when power is not available to the thermoelectric assembly. This capability is particularly useful if the refrigerator is used for drug storage or as a shipping container. Further still, the use of superinsulation may eliminate or reduce the need for any type of mullion heaters on the exterior because moisture may not condense on the surface of the enclosure.

A further significant technical advantage of a refrigerator incorporating the present invention includes the ability to mount the thermoelectric assembly and other components of the cooling system on the refrigerator door assembly. This arrangement results in an enclosed structure which is electrically passive with no or few openings or penetrations which may improve the overall operating efficiency of the refrigerator and/or make manufacturing easier and less costly. This arrangement also makes repair and replacement of components easier.

Yet another technical advantage of the refrigerators of the present invention is provided by the incorporation of thermoelectric assembly with superinsulation material. The use of thermoelectrics avoid on-off cycling associated with vapor compressors. Also, thermoelectrics are compatible with the reduced heat load associated with superinsulations. The same unit can act as a refrigerator or freezer simply by adjusting the set temperature. Additionally, this arrangement involves very few moving parts, and thus may decrease wear and increase reliability. Additionally, fewer moving parts, reduces the items that must be lubricated and may enhance the mean time between failure of components. Further still, this arrangement helps to reduce noise and vibration of the system.

An additional significant technical advantage of the present invention includes combining a thermoelectric assembly, superinsulation panels and phase change materials in accordance with the present invention to provide cooling for a wide variety of containers, boxes and other types of enclosed structures. By mounting the various components of the cooling system on the door of the enclosed structure, in accordance with the present invention, the number of openings in the enclosed structure required to remove heat from within the enclosed structure may be substantially reduced and manufacturing made easier. Also, the use of a thermoelectric assembly as part of the cooling system for the refrigerator, eliminates the use of CFCs. Superinsulation panels incorporated as part of the refrigerator are also preferably manufactured without the use of fluorocarbons. The result is an environmentally benign system that meets all national and international regulatory requirements with respect to fluorocarbons.

In accordance with another aspect of the present invention, a refrigerator is provided in which the cooling system is mounted on the refrigerator door. The cooling system preferably includes a thermoelectric assembly having a first heat sink secured to the hot side of the thermoelectric device and a second heat sink secured to the cold side of the thermoelectric device. The refrigerator door and the enclosed structure of the refrigerator preferably include superinsulation materials. The enclosed structure of the refrigerator preferably includes an inner liner and an outer liner with superinsulation materials formed therebetween. An electrical motor may be mounted on the door adjacent to the thermoelectric assembly. The electric motor may include a rotating shaft which extends through the motor and the door. An impeller or propeller may be mounted on each end of the rotating shaft to assist with the circulation of air relative to the respective hot sink and cold sink. The propeller and/or impeller mounted on the interior of the door also assists with the circulation of air within the interior of the refrigerator.

BRIEF DESCRIPTION OF THE DRAWINGS

For a more complete understanding of the present invention, and the advantages thereof, reference is now made to the following written description taken in conjunction with the accompanying drawings, in which:

FIG. 5 is a drawing partially in elevation and partially in section with portions broken away showing portions of the door assembly of the refrigerator of FIG. 1 with a cooling system incorporating an aspect of the present invention;

FIGS. 6a–6d are schematic drawings partially in section and partially in elevation with portions broken away showing a refrigerator having a cooling system mounted on the door, the phase change materials located at various positions within the interior of the refrigerator, and various air flow management systems according to an aspect of the present invention; and FIG. 7 is an isometric drawing of a refrigerator or enclosed structure incorporating another embodiment of the present invention.

DETAILED DESCRIPTION OF THE INVENTION

The preferred embodiments of the present invention and its advantages are best understood by referring to FIGS. 1 through 7 of the drawings, like numerals being used for like and corresponding parts of the various drawings.

Figure 2:
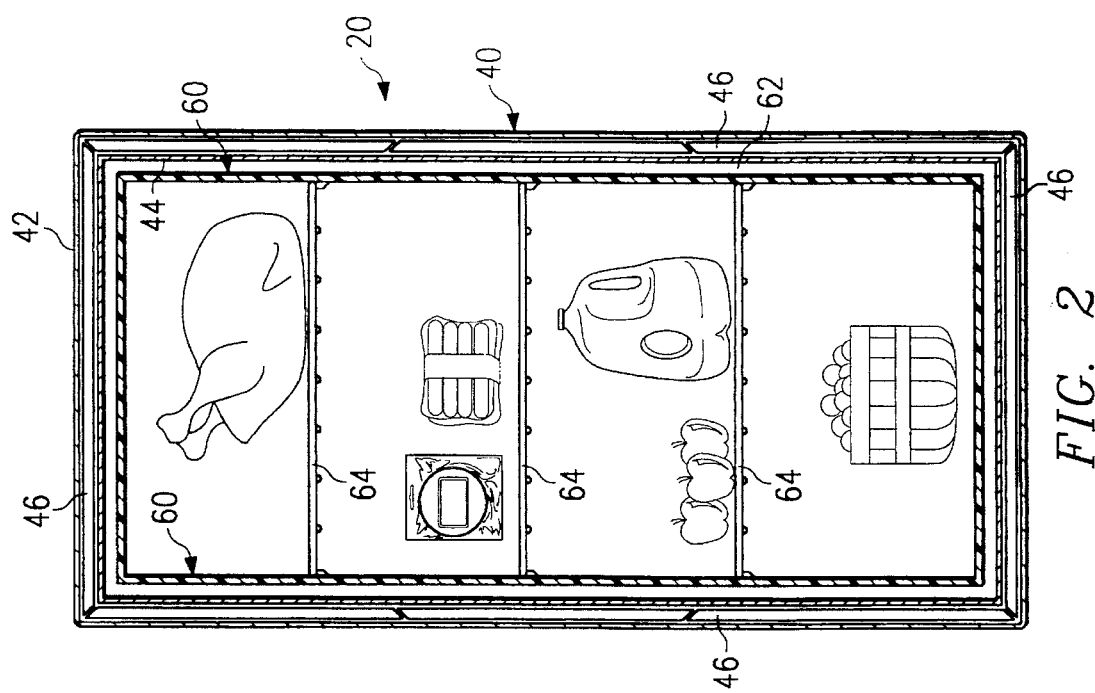
FIG. 2 is a drawing in section with portions broken away taken along line 2—2 of FIG. 1 showing the use of superinsulation panels, a portion of the interior air flow path, and an internal cabinet associated with the refrigerator of FIG. 1.
Figure 1:
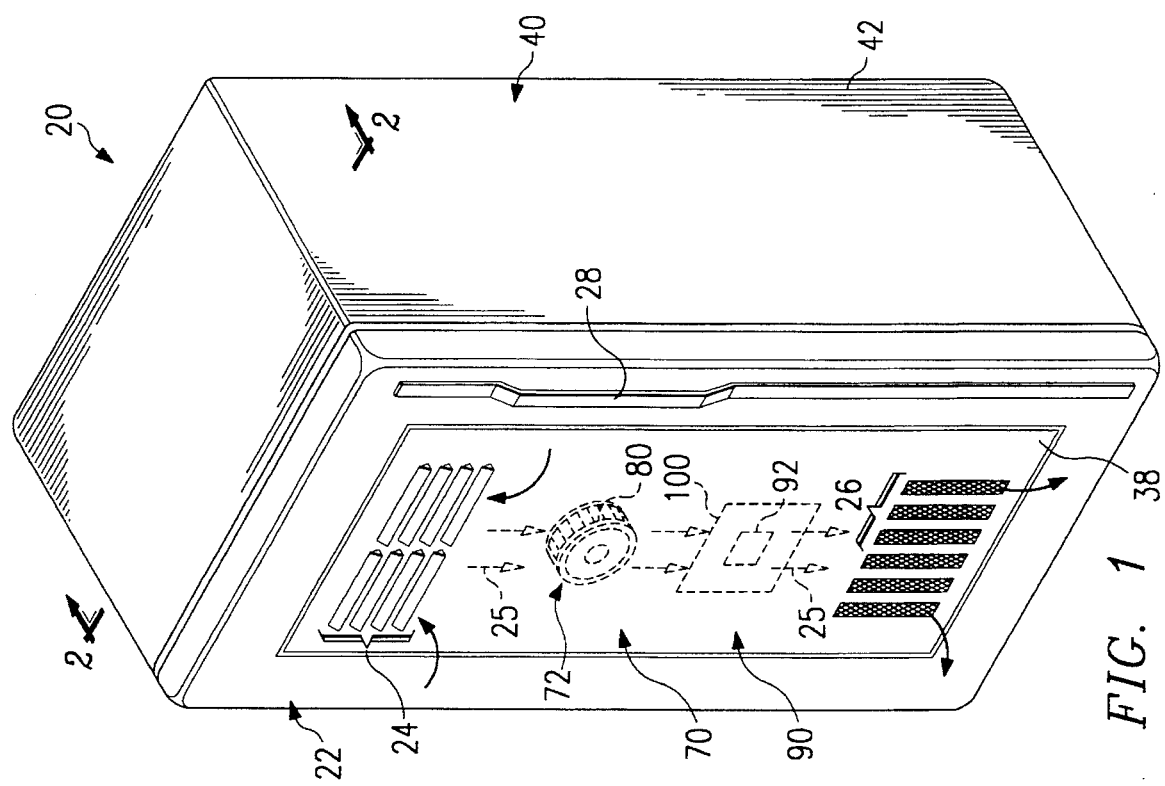
FIG. 1 is an isometric drawing of a refrigerator or enclosed structure having a thermoelectric assembly, superinsulation panels, and an internal air flow path incorporating one embodiment of the present invention.

Refrigerator 20 incorporating one embodiment of the present invention is shown in FIGS. 1 and 2. The principal components of refrigerator 20 include enclosed structure 40 having door assembly 22 with cooling system 70 mounted thereon. Door assembly 22 provides access to the interior of enclosed structure 40. Cooling system 70 mounted on door assembly 22 includes air circulating means 72 and thermoelectric assembly 90. Door assembly 22 preferably includes a plurality of air inlet openings 24 and a plurality of air outlet openings 26. Handle 28 and hinges (not shown) are also provided for use in opening and closing door 22. Refrigerator 20 may function to maintain the temperature in enclosed structure 40 in a selected temperature range, which may be above or below zero degrees Celsius.

As best shown in FIG. 2, enclosed structure 40 preferably includes outer liner 42 and inner liner 44 with a plurality of superinsulation panels 46 disposed therebetween. As will be explained later in more detail, superinsulation panels 46 are preferably included as part of door assembly 22 as well. Also, superinsulation materials other than panels 46 may be satisfactorily used with the present invention.

Internal cabinet 60 is preferably disposed within the interior of enclosed structure 40 to partially define air flow path 62 between the exterior of cabinet 60 and interior of inner liner 44. Air flow path 62 (FIGS. 3a–d; 4a–d) may be used to provide a "air curtain" which further enhances the overall performance of cooling system 70 and refrigerator 20. The benefits of providing such an air curtain will be described later in more detail. A plurality of shelves 64 are preferably provided within internal cabinet 60 for use in storing food or other perishable items within refrigerator 20. The number and location of shelves 64 may be varied depending upon the function and intended uses of refrigerator 20. For some applications, one or more doors may be included as part of internal cabinet 60.

Insulation performance is often measured by the use of "R" values, where R is a thermal resistivity in $HrFt^2$ F/Btu. Higher R-values indicate better insulating performance. R-value per inch is frequently used to compare the thermal performance of different insulating materials. For example, fiberglass may have R-value per inch of approximately 3.2 $HrFt^2$ F/Btu, and styrene foam may have an R-value per inch of approximately 5 $HrFt^2$ F/Btu. The benefits of the present invention are best achieved by using insulating materials with an R-value per inch greater than 20 $HrFt^2$ F/Btu R20/inch).

For purposes of this patent application, the term "superinsulation panel" is used to refer to insulating material having an R-value per inch (resistance to the transfer of thermal energy) greater than approximately twenty R20/inch). Various types of superinsulation panels may be satisfactorily used with the present invention. Examples of such superinsulation panels which have a high R-value are shown in U.S. Pat. No. 5,090,981 entitled Method for Making High R Superinsulation Panel and U.S. Pat. No. 5,094,899 entitled High R Superinsulation Panel, and a preferred superinsulation insulation is described in pending U.S. patent application Ser. No. 07/993,883, filed Dec. 23, 1992; these three references are incorporated by reference for all purposes within this application. Such superinsulation panels are commercially available from Owens-Corning Fiberglas Corporation located in Toledo, Ohio. Owens-Corning uses the trademark "AURA" with respect to such superinsulation panels.

Superinsulation panels 46 shown in FIGS. 2 and 5 have a generally rectangular configuration. However, superinsulation panels having square, oval, circular, or any other geometric configuration may be satisfactorily used with the present invention. Referring to FIG. 5, superinsulation panels 46 preferably comprise a sealed envelope 48 having a first wall 50 and a second wall 52. Various types of filler material or insulating material 54 and supporting structures 56 may be disposed within envelope 48 between walls 50 and 52. Envelope 48 is preferably formed with gas impervious materials. Envelope 48 is typically sealed around the edges of walls 50 and 52 to maintain the desired vacuum within envelope 48. For some applications, superinsulation panels 46 may be evacuated to a vacuum between $10^{-4}$ Torr ($10^{-14}$ for deep space applications) and 10 Torr.

U.S. Pat. Nos. 5,090,981 and 5,094,899 teach the use of mineral fiber board and particulate matter packed in the interstices of the fiberboard to perform the functions of filler material 54 and supporting structure 56. U.S. Pat. No. 5,157,893 entitled Compact Vacuum Insulation teaches the use of spherically shaped glass or ceramic beads which function as filler material 54 and continuous sheets of metal which function as supporting structure 56. U.S. Pat. No. 5,252,408 entitled Vacuum Insulated Panel and Method of Forming a Vacuum Insulated Panel, teaches the use of a compressed block of particulate charcoal, activated carbon black, silica gel or other appropriate mixtures to perform the function of filler material 54 and supporting structure 56. U.S. Pat. No. 5,082,335 entitled Vacuum Insulation System for Insulating Refrigerator Cabinets, teaches the use of a vacuum insulation panel having multiple sealed compartments containing microporous filler insulation material. Each of the above-referenced patents are incorporated by reference for all purposes within this application.

During the assembly of enclosed structure 40, superinsulation panels 46 are preferably positioned between inner liner 44 and outer liner 42. In a similar manner, referring to FIG. 5, during the manufacture of door assembly 22, superinsulation panels 46 are preferably disposed between an inner liner 30 and an outer liner 32. As will be described later in more detail, openings 34 and 36 are preferably provided through liners 30 and 32 for use in mounting cooling system 70 with door assembly 22.

The principal components of cooling system 70 include air circulating means 72 and thermoelectric assembly 90. The various components which comprise cooling system 70 may be mounted on either the exterior portion or the interior portion of door assembly 22 with superinsulation panels 46 disposed therebetween. Cover 38 is preferably placed over the exterior portion of door assembly 22, and cover 39 placed over the interior portion of door assembly 22. As will be explained later in more detail, covers 38 and 39 function as part of the air flow management system to establish the desired air flow path within cooling system 70.

Air circulating means 72 preferably includes electrical motor 74 mounted on the exterior of door assembly 22 adjacent to thermoelectric assembly 90. Rotating shaft 76 preferably extends through electrical motor 74 and opening 34 provided in liners 30 and 32. Sealing means such as a plurality of labyrinth seals 78 are preferably disposed between opening 34 and the adjacent portions of rotating shaft 76 to prevent undesired air flow and resulting thermal energy transfer through opening 34 along rotating shaft 76. Impeller 80 is preferably secured to rotating shaft 76 on the exterior portion of door assembly 22. Impeller 82 is preferably secured to rotating shaft 76 on the interior portion of door assembly 22. Various types of propellers and/or fan blades could be attached to rotating shaft 76 in place of impellers 80 and 82.

Thermoelectric assembly 90 includes thermoelectric device 92 with first heat sink 100 and second heat sink 102 disposed on opposite sides thereof. Thermoelectric device 92 preferably includes a plurality of thermocouples or thermoelectric elements 94 disposed between thermally conductive plates 96 and 98. For some applications, plates 96 and 98 may be formed from ceramic and/or composite materials as desired; of course, plates 96 and 98 may formed of other electrically insulating materials. Thermoelectric elements 94 may be selected from materials such as bismuth telluride to provide an array of P-N junctions with the desired thermoelectric characteristics to allow thermoelectric device 92 to function as a heat pump.

Thermoelectric elements 94 are preferably connected electrically in series and thermally in parallel. An electrical conductor or electrical power cord (not shown) may be provided to supply electrical energy which may be from a twelve (12) volt DC power supply (not shown). The power supply can be a battery, DC power generator, AC/DC converter, or any other appropriate source of DC electrical power. When DC electrical power is supplied to thermoelectric device 92, heat is absorbed on the cold side represented by plate 98 and passes through thermoelectric elements or thermocouples 94 and is dissipated on the hot side at plate 96.

The efficiency of thermoelectric device 92 is substantially improved by attaching first heat sink 100 to hot plate 96 and second heat sink 102 to cold plate 98. Second heat sink 102 preferably includes cold finger 104 which may be positioned within opening 36. Various types of sealing means 106 such as elastomeric material may be disposed between the exterior of cold finger 104 and the interior of opening 36 to prevent air flow and the resulting undesired transfer of thermal energy between the exterior of door assembly 22 to the interior of enclosed structure 40. Cold finger 104 cooperates with opening 36 and seal means 106 to provide a portion of a means for mounting thermoelectric assembly 90 on door assembly 22. Cold finger 104 may be formed as an integral part of second heat sink 102. Alternatively, cold finger 104 may be formed as a separate component and bonded with heat sink 102 and conductive plate 98. Various types of bonding techniques and mounting procedures may be used to secure first heat sink 100 and second heat sink 102 with thermoelectric device 92.

Heat sinks 100 and 102 are shown as fin type heat exchangers which may be extruded as a single unit from appropriate material such as aluminum or copper. Heat sinks 100 and 102 could be manufactured from other types of material having the desired thermal conductivity and strength characteristics. In addition, other heat exchanger designs such as pin fin, slotted fin or fin welded heat sinks could be used in place of the single unit extruded heat sinks 100 and 102 shown in FIG. 5.

When DC electrical power is supplied to thermoelectric device 92, heat energy will flow from the interior of refrigerator 20 through second heat sink 102 and cold finger 104 to conductive plate 98. The heat energy at conductive plate 98 is transferred by thermoelectric elements 94 to conductive plate 96 and dissipated or diffused to the exterior of refrigerator 20 by first heat sink 100. Air circulating means 72 is positioned adjacent to heat sink 100 and/or heat sink 102 to assist with the circulation of air and the transfer of heat energy from the interior of refrigerator 20 to the exterior of refrigerator 20 through thermoelectric assembly 90. U.S. Pat. No. 4,726,193 entitled Temperature Controlled Picnic Box shows an example of air circulating means used with a thermoelectric device and is incorporated by reference for all purposes in this application.

Thermoelectric assembly 90 may be mounted on door assembly 22 by using various techniques and procedures. The principal requirement in mounting thermoelectric assembly 90 on door assembly 22 is to ensure that conductive plate 98 of thermoelectric device 92 and cold finger 104 be disposed adjacent to each other. In a similar manner, heat sink 102 and conductive plate 98 are preferably disposed adjacent to each other on the opposite sides of thermoelectric device 92. Various types of mounting procedures may be satisfactorily used as long as this relationship is maintained between thermoelectric device 92, cold finger 104 and heat sinks 100 and 102.

For many applications of the present invention, cooling system 70 is preferably mounted on door assembly 22. This location minimizes the number of penetrations in enclosed structure 40. By placing cooling system 70 on door assembly 22, it is much easier to maintain, repair, and/or manufacture refrigerator 20. However, an important feature of the present invention is the ability to vary the location of cooling system 70 as required for the specific application in which the resulting refrigerator will be used.

Figure 3A:
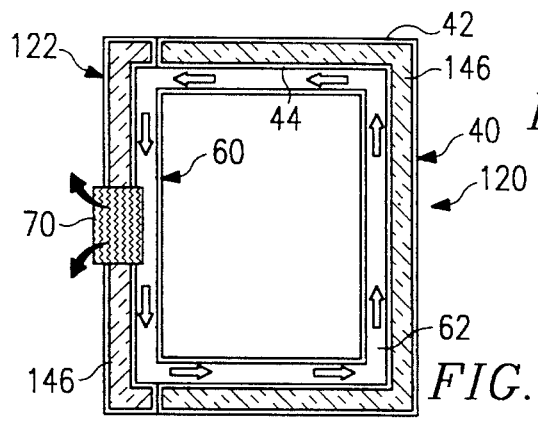
FIGS. 3a–3d are schematic drawings in section with portions broken away showing alternative locations for installing a cooling system in a refrigerator or enclosed structure having superinsulation materials and an internal air flow path in accordance with an aspect of the present invention.
Figure 4A:
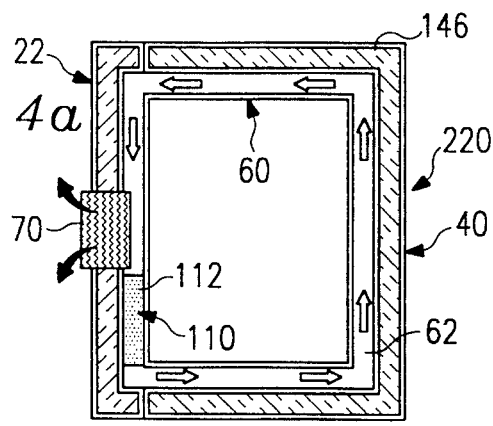
FIGS. 4a–4d are schematic drawings in section with portions broken away showing a refrigerator or enclosed structure having superinsulation materials, a cooling system and of a thermal energy storage container with phase change materials at various locations incorporating an aspect of the present invention.
Figure 3B:
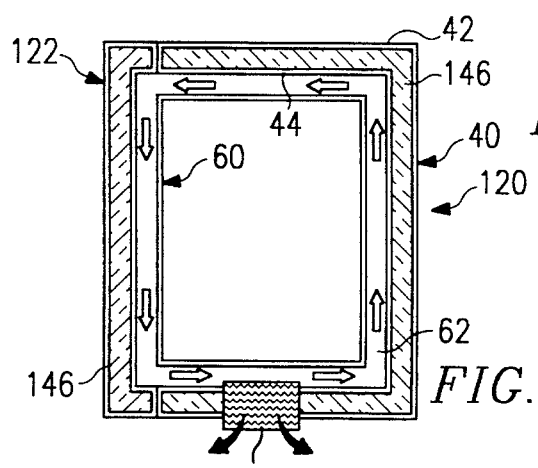
Figure 4B:
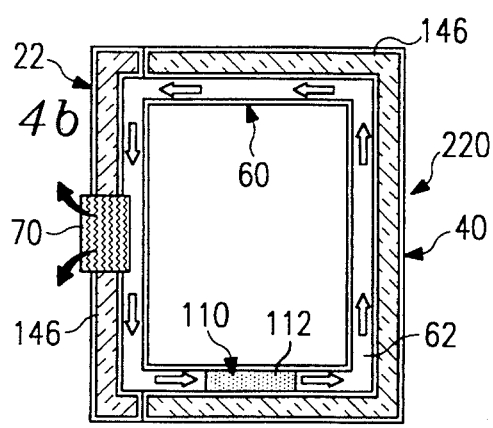
Figure 3C:
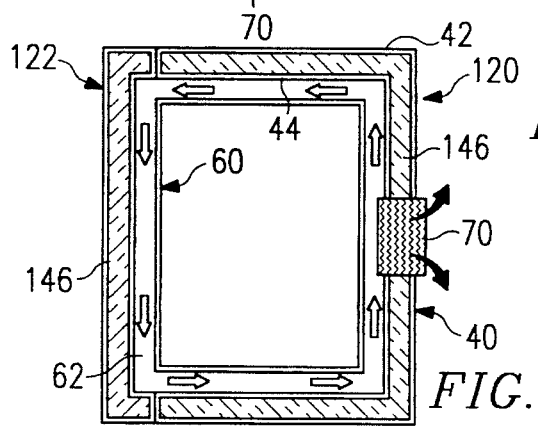
Figure 4C:
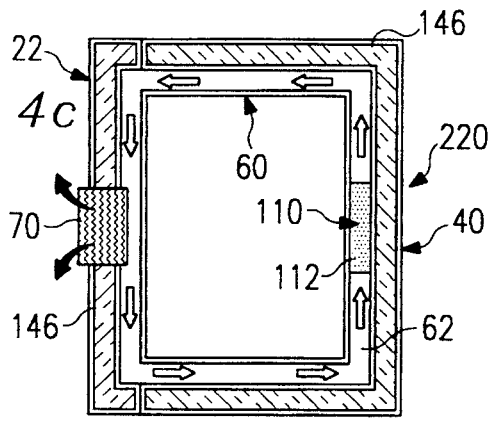
Figure 3D:
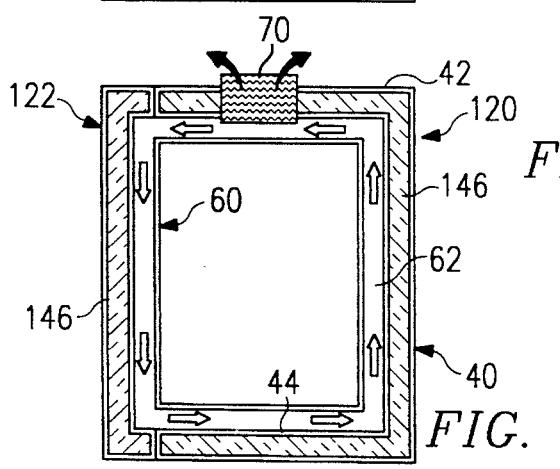

FIGS. 3a–3d contain schematic representations of refrigerator 120 showing some of the different locations in which cooling system 70 incorporating aspects of the present invention may be installed in refrigerator 120. In FIG. 3a, cooling system 70 is shown installed on a door assembly 122. In FIG. 3b, cooling system 70 is shown installed at the bottom or lower portion of refrigerator 120. In FIG. 3c, cooling system 70 is shown installed in the back of refrigerator 120. In FIG. 3d, cooling system 70 is shown installed in the top of refrigerator 120. This flexibility in varying the location of cooling system 70 represents an important benefit of combining a thermoelectric device with superinsulation materials.

As shown in FIGS. 3a–3d, refrigerator 120 preferably includes superinsulation materials 146 disposed between outer liner 42 and inner liner 44. If desired, superinsulation material 146 may be superinsulating panels analogous to panels 46 as previously described for refrigerator 20. Alternatively, superinsulation material 146 may be formed by using "a box-in-a-box technique" as compared to a plurality of superinsulation panels 46. This procedures allows forming superinsulation materials 146 having the general configuration which more closely resembles the desired configuration for enclosed structure 40 as compared to using a plurality of superinsulation panels 46.

Figure 4D:
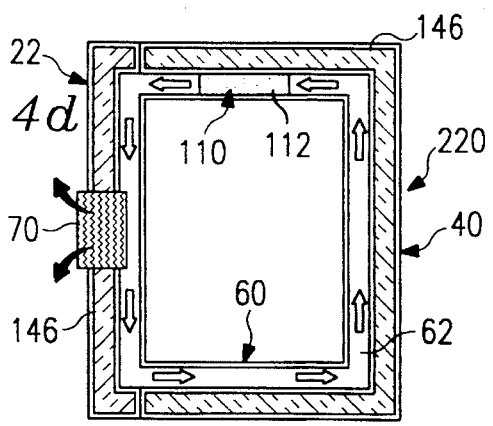

Referring now to FIGS. 4a–4d, another important aspect of the present invention includes thermal energy storage container 110 with a phase change material 112 disposed therein. Thermal energy storage container 110 may be positioned at various locations on the interior portion of door assembly 22 and/or the interior of enclosed structure 40. FIGS. 4a–4d show some of the locations at which thermal energy storage container 110 may be positioned within refrigerator 220 incorporating aspects of the present invention, e.g., on the door assembly 22 (FIG. 4a), on the bottom portion (FIG. 4b), on the back portion (FIG. 4c), and on the top portion (FIG. 4d).

Thermal energy storage container 110 is preferably disposed within air flow path or air curtain 62. Thermal energy storage container 110 may simply be a rectangular box as shown in FIGS. 4a–4d with phase change materials 112 therein. However, for many applications, thermal energy storage container 110 may include a plurality of longitudinal passageways which allow air flow through container 110 and resulting in increased transfer of thermal energy from the air flowing therethrough to the phase change material 112.

For some applications, thermal energy storage container 110 may have a geometric configuration corresponding approximately to heat sink 100 and/or heat sink 102. Other heat exchanger designs such as pin fin, slotted fin or fin welded heat exchangers may be satisfactorily used for thermal energy storage container 110.

Various types of phase change material 112 may be satisfactorily disposed within thermal energy storage container 110 for use as an aspect of the present invention. For example, in some applications, water may be a satisfactory phase change material for use with the present invention; the melting point associated with water is 0° C. If this is the desired temperature for operation of refrigerator 220, water may be satisfactory for use as phase change material 112 within thermal energy container 110.

As another example, hydrated salt solutions may also be used as phase change material 112 to store and release thermal energy associated with repeated freezing and melting during which latent thermal energy of the phase change material is released or absorbed. As a few additional examples, paraffin, organic salts, metal hydrides, or fullerine hydrides may be used for material 112. Any compound or mixture having the appropriate latent heat characteristics and phase change temperatures may be satisfactorily used with the invention.

U.S. Pat. No. 4,609,036 entitled Bulk Heat or Cold Storage Device for Thermal Energy Storage Compounds, and U.S. Pat. No. 4,290,416 entitled Phase Change Energy Storage Panel for Environmentally Driven Heating and Cooling System provide extensive information concerning various types of hydrated phase change materials and Glauber's salt that are satisfactory for use with the present invention. For some applications, it may be desirable to use salt hydrated solutions which have a melting point corresponding to a lower temperature which will be maintained within refrigerator 220. Depending upon the desired operating temperature for refrigerator 220, the appropriate phase change material 112 may be selected. Both of the above-referenced patents are incorporated by reference for all purposes within this application.

By combining the benefits of superinsulation panels 46 and/or superinsulation materials 146 with thermal energy storage container 110 having phase change material 112, the overall operating efficiency of refrigerator 220 and cooling system 70 may be substantially enhanced. During periods of low heat load within enclosed structure 40, cooling system 70 may be used to cool phase change material 112 from a liquid phase to a solid phase and store the resulting "cold energy" in the form of latent heat characteristics associated with phase change material 112. During periods of high heat load, for example when door assembly 22 is opened and food placed within enclosed structure 40, the "cold energy" stored within thermal energy container 110 will absorb heat and thereby assist cooling system 70 in returning the temperature within refrigerator 220 to its desired operating level. The use of phase change materials thus allows optimizing the benefits of using thermoelectric assembly 90 as part of cooling system 70. During periods of heavy usage of refrigerator 220, thermoelectric assembly 90 will be principally used to cool the interior of enclosed structure 40 and any items placed therein, and then during periods of low usage of refrigerator 220, such as during nighttime periods, cooling system 70 will be used to store "cold energy" in phase change material 112. A bypass valve may be incorporated to assist in the situation where the "cold energy" of the phase change material 112 is exhausted as described below in connection with FIG. 6c.

The present invention allows optimizing of the location of cooling system 70 and thermal energy storage container 110 in the air flow path associated with the resulting refrigerator incorporating the present invention. A plethora of embodiments are possible; some of these alternative embodiments of the present invention are represented by refrigerators 320, 420, 520 and 620 shown respectively in FIGS. 6a–6d.

The present invention includes various air flow management systems which maximize the efficiency of cooling system 70 and the associated thermoelectric assembly 90 along with thermal energy storage container 110. The various components of the air management system may include air circulating means 72, the air flow paths provided within the exterior portion and the interior portion of door assembly 22 and the air flow path within the interior of the enclosed structure associated with each refrigerator incorporating the present invention.

For some applications as represented by thermoelectric refrigerator 320 shown in FIG. 6a, cooling system 70 is mounted on door assembly 22 with air circulating means 72 disposed above thermoelectric assembly 90. This configuration allows impeller 80 to draw air into the exterior portion of door assembly 22 through inlets 24 and to blow air downwardly over first heat exchanger 100 and out through outlets 26. Impeller 82 installed on the interior portion of door assembly 22 directs air flow downwardly over second heat sink 102 and out through air flow exit 108 in the lower portion of door assembly 22. Refrigerator 20 and refrigerator 320 preferably have the same air flow path through the exterior portions and the interior portions of door assembly 22. Arrows 25 indicate the air flow path in the exterior portion of door assembly 22. Arrows 27 indicate the air flow path in the interior portion of door assembly 22.

In the embodiment shown in FIG. 6a, internal cabinet 360 is preferably disposed within enclosed structure 40. Internal cabinet 360 is substantially modified in design and size as compared to previously described internal cabinet 60 used with refrigerator 20. Thermal energy storage container 110 is preferably disposed along the bottom and the back portion of enclosed structure 40. Internal cabinet 360 cooperates with air exit 108 to direct air flowing from second heat sink 102 to thermal energy storage container 110. The air then flows upwardly along the back of enclosed structure 40 and down over shelves 64. Internal cabinet 360 preferably includes a return plenum, or plenum chamber 366 which directs the air flow back to impeller 82. An inner door 368 may be provided as part of internal cabinet 360 to assist in establishing the desired air flow path as shown in FIG. 6a.

Since phase change material 112 contained within thermal energy storage container 110 may have considerable weight for some materials, placing thermal energy storage container 110 along the bottom and back of enclosed structure 40 offers enhanced stability for refrigerator 320. The preferred air flow path for refrigerator 320 is through container 110 in the bottom portion of structure 40 and up the back portion of enclosed structure 40. The air then can flow outwardly and down over shelves 64. Internal container 360 will preferably have an interior door 368 to direct the air flow back to impeller 82.

Referring again to FIG. 6b, thermoelectric refrigerator 420 includes cooling system 70 installed near the lower portion of door assembly 422 with thermoelectric assembly 90 located above air circulating means 72. This arrangement results in air flow from the bottom exterior portion of door assembly 422 upwardly over heat exchanger 100 and out through the upper exterior portion of door assembly 422.

The internal air flow path within refrigerator 420 is also upwardly from impeller 82 over heat exchanger 102, and then through thermal energy storage container 110. Internal cabinet 60 cooperates with door assembly 422 and the interior of enclosed structure 40 to direct the air flow through passageway 62 and back to impeller 82. This air flow management system creates an air curtain around internal cabinet 60 to aid in maintaining the desired temperature within refrigerator 420.

Referring again to FIG. 6c, thermoelectric refrigerator 520 includes an alternative air flow management system. Door assembly 522 for refrigerator 520 is substantially the same as previously described door assembly 422 except thermal energy storage container 110 has been moved to the upper portion of enclosed structure 40. Also, air bypass valve 504 is installed within internal cabinet 60 adjacent to thermal energy storage container 110.

During normal operation of refrigerator 520, air will flow upwardly from second heat sink 102 through thermal energy storage container 110 and down over food or other items placed on shelves 64. Return plenum 366 then directs the air flow back to impeller 82. During periods of high heat load such as when door assembly 522 is opened for extended periods and/or food or other items, which are warmer than the internal temperature of refrigerator 520, phase change material 112 may become exhausted. For an example of the phase change material 112 becoming exhausted, if water is used for material 112, once all the water in the form of ice melts, the phase change of material 112 is complete and it may be said to be exhausted. If material 112 is exhausted, the ability of material 112 to absorb heat from enclosure structure 40 may be comprised, and in fact, material 112 may begin to transfer heat to the air being circulated through it. Therefore, it may be desirable to redirect the circulating air to bypass material 112 until enclosure structure 40 has reached a temperature within the desired temperature range. Bypass valve 504 may be provided for this purpose.

Bypass valve 504 may be placed within internal cabinet 60 with a sensor or transducer coupled thereto for causing bypass valve 504 to redirect the circulating air in enclosure structure 40, in full or in part, from passing over material 112. The sensor may be any of numerous types of sensors or transducers; for example, the sensor may be a temperature sensor in container 110 or a sensor for measuring the expansion/contraction of container 110 or an optical sensor for determining the phase of material 112 based on the extent of transparency. For the embodiment shown, when the sensor detects that phase change material 112 is exhausted, bypass valve 504 moves to its second position which partially blocks air flow into thermal energy storage container 110 and allows air to directly flow into internal cabinet 60. Thus, air flow bypass valve 504 allows cooling system 70 to reduce the temperature within the interior of refrigerator 520 first rather than also cooling the phase change materials contained within internal thermal energy container 110. Later, when the temperature within refrigerator 520 has returned to the desired range, air bypass valve 504 may return to its first position which allows cold air (e.g., colder than the freezing point of phase change material 112) to flow through thermal energy storage container 110 and store "cold energy" in phase change material 112. Thus, air flow bypass valve 504 optimizes the air distribution and the cooling capability of refrigerator 520.

Referring again to FIG. 6d, thermoelectric refrigerator 620 is similar to previously described thermoelectric refrigerator 420, except thermal energy storage container 110 has been installed within the top portion of enclosed structure 40 rather than on door assembly, e.g., door assembly 522.

For some of the previously described applications internal cabinet 360 and/or 60 may contain an interior door to assist in providing the desired air flow. For other applications an internal door is not required and cover 39 on the interior of the associated door assembly 22, 422, or 522 will provide the desired air flow path.

FIG. 7 depicts an alternative embodiment of an aspect of the present invention. Enclosed structure 720 has a front door assembly 722 and a plurality of side walls such as side wall 742 that form refrigerator 740. Refrigerator 740 is preferably fabricated with superinsulating materials as previously described. Also, refrigerator 740 may include a thermal energy storage container and phase change materials as previously described. The cooling system for refrigerator 740 is located on the top; heat sink 100 is shown coupled to thermoelectric device 90 on top surface 724. The embodiment of FIG. 7 does not include an air circulating means.

The present invention may be used with various types of enclosed structures such as a cabinet for electronic equipment, pharmaceutical storage, organ transplant containers, etc. Cooling system 70, superinsulating materials 46 and 146, and thermal energy storage container 110 incorporating the present invention are not limited to use with refrigerators.

Although the present invention and its advantages have been described in detail, it should be understood that various changes, substitutions and alterations can be made without departing from the spirit and scope of the invention as defined by the following claims.

What is claimed is:

1. Apparatus for controlling the temperature within an enclosed structure having a door for providing access to the enclosed structure, comprising:

a thermoelectric device mounted on the door with a first heat sink disposed on one side of the thermoelectric device and a second heat sink disposed on the other side of the thermoelectric device;

the first heat sink disposed on the exterior of the door and the second heat sink disposed on the interior of the door;

the thermoelectric device having a hot side and a cold side;

the first heat sink attached to the hot side and the second heat sink attached to the cold side;

means for circulating air with respect to the first heat sink;

means for circulating air with respect to the interior of the enclosed structure and the second heat sink;

the enclosed structure formed from insulation materials having an R-value per inch greater than approximately twenty (R20/inch);

the insulation materials selected from the group comprising vacuum panels filled with mineral fiberboard, vacuum panels filled with glass beads, and vacuum panels filled with microporous filler material;

the air circulating means comprising an electrical motor mounted on the door;

a rotating shaft extending through the electrical motor and a portion of the door;

the rotating shaft having a first end projecting from the exterior of the door and a second end projecting from the interior of the door;

a first impeller attached to the first end of the rotating shaft and a second impeller attached to the second end of the rotating shaft;

an internal cabinet disposed within the enclosure and providing a portion of means for directing the circulation of air with respect to the second heat sink and selected portions of the interior of the enclosure;

a thermal energy storage container disposed within the interior of the enclosed structure;

a phase change material contained within the thermal energy storage container; and an air bypass valve for directing a portion of the air circulated by the means for circulating air with respect to the interior of the enclosed structure and the second heat sink to bypass the thermal energy storage container.

2. The apparatus of claim 1 further comprising a heat sensor and wherein the bypass valve is responsive to the heat sensor.

3. A thermoelectric refrigerator comprising:

an enclosure having five walls and an opening to the interior of the enclosure;

a door assembly mounted on the opening for selectively covering access to the interior of the enclosure;

a thermoelectric assembly for maintaining the temperature in the interior of the enclosure within a selected range;

the walls formed from superinsulation materials having an overall R-value per inch of greater than approximately twenty (R20/inch);

an internal cabinet disposed within the enclosure;

an air flow path formed between the exterior of the cabinet and the interior of the enclosure;

a thermel energy storage container disposed within the air flow path;

a phase change material contained within the thermal energy storage container; and an air bypass valve for directing a portion of the air circulated by the means for circulating air with respect to the interior of the enclosure and the second heat sink into the enclosure without passing through the thermal energy storage container.

4. A thermoelectric refrigerator for controlling the temperature within an enclosed structure, the refrigerator comprising:

a plurality of superinsulated walls for forming the enclosed structure;

a door coupled to the plurality of superinsulated walls for providing access to the enclosed structure;

a thermoelectric device mounted on the door with a first heat sink disposed on a first side of the thermoelectric device and a second heat sink disposed on a second side of the thermoelectric device;

the first side of the thermoelectric device disposed on the exterior of the door and the second side of the thermoelectric device disposed on the interior of the door;

a means for circulating air with respect to the first heat sink and with respect to the interior of the enclosure and the second heat sink, the circulating means comprising:

an electrical motor mounted on the door with a rotating shaft extending through the electrical motor and door, the rotating shaft having a first end projecting from the exterior of the door and a second end projecting from the interior of the door, a first impeller attached to the first end of the rotating shaft, and a second impeller attached to the second end of the rotating shaft;

a thermal energy storage container disposed within the interior of the enclosure;

a phase change material contained within the thermal energy storage container; and an air bypass valve for selectively directing a portion of the air circulated in the interior of the enclosure to bypass at least in part the thermal energy storage container.

5. The thermoelectric refrigerator of claim 4 wherein the superinsulated walls have an R-value per inch greater than approximately twenty (R20/inch).

6. The thermoelectric refrigerator of claim 4 wherein the superinsulated walls comprise a gas impervious material.

* * * * *

UNITED STATES PATENT AND TRADEMARK OFFICE
CERTIFICATE OF CORRECTION

PATENT NO. : 5,522,216
DATED : June 4, 1996
INVENTOR(S) : Park et al.

It is certified that error appears in the above-identified patent and that said Letters Patent is hereby corrected as shown below:

Column 1, lines 3-9, delete

"NOTICE

Portions of this invention were made with support of the United States Government under contract No. NAS8-5000 awarded by the National Aeronautics and Space Administration (NASA) and subcontract No. GY5509. The Government may have certain rights to the invention under the contract."

and insert

-- NOTICE

Portions of the invention described herein were made in the performance of work under National Aeronautics and Space Administration (NASA) Contract No. NASA-50000, subcontract No. GY5509 and are subject to the provisions of Section 3.05 of the National Aeronautics and Space Act of 1958 (42 U.S.C. 2457). --.

Signed and Sealed this

Eighth Day of December, 1998

*Attest:*

BRUCE LEHMAN

*Attesting Officer*  *Commissioner of Patents and Trademarks*